(12) United States Patent
Zentner

(10) Patent No.: US 11,305,285 B2
(45) Date of Patent: Apr. 19, 2022

(54) CAP FOR CLOSING A SAMPLE CONTAINER FOR MICROWAVE TREATMENT AND A METHOD AND SAMPLE ASSEMBLY FOR PERFORMING MICROWAVE TREATMENT

(71) Applicant: ANTON PAAR GMBH, Graz-Strassgang (AT)

(72) Inventor: Rainer Zentner, Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 374 days.

(21) Appl. No.: 16/508,800

(22) Filed: Jul. 11, 2019

(65) Prior Publication Data
US 2020/0023356 A1   Jan. 23, 2020

(30) Foreign Application Priority Data

Jul. 20, 2018 (AT) .................. A50631/2018

(51) Int. Cl.
| | | |
|---|---|---|
| G05D 16/00 | (2006.01) | |
| B01L 3/00 | (2006.01) | |
| B01J 3/04 | (2006.01) | |
| B01J 19/12 | (2006.01) | |

(52) U.S. Cl.
CPC ............ *B01L 3/5082* (2013.01); *B01J 3/042* (2013.01); *B01J 19/126* (2013.01); *B01J 2219/0027* (2013.01); *B01J 2219/1233* (2013.01); *B01L 2200/0689* (2013.01)

(58) Field of Classification Search
CPC ....... B01L 2300/049; B01L 2200/0689; B01L 2300/048
USPC ................................................. 422/113, 568
See application file for complete search history.

(56) References Cited

U.S. PATENT DOCUMENTS

| 5,637,803 A | 6/1997 | Schalk et al. |
|---|---|---|
| 6,926,939 B2 | 8/2005 | Hargett, Jr. et al. |

FOREIGN PATENT DOCUMENTS

DE       9309355.1 U1    12/1994

*Primary Examiner* — Natalia Levkovich
(74) *Attorney, Agent, or Firm* — Laurence A. Greenberg; Werner H. Stemer; Ralph E. Locher

(57) ABSTRACT

A cap closes a sample vessel for the microwave treatment of samples. The cap contains a closure body for closing the sample vessel. The closure body is fitted to the sample vessel and closes the sample vessel at a sealing surface. A spring-loaded pressure relief valve and a vent duct are provided. The vent duct, the pressure relief valve and the closure body are configured in such a manner that the vent duct connects the closure body via the pressure relief valve to the surrounding area such that when a defined first pressure level is exceeded at the closure body excess pressure can escape through the vent duct into the area surrounding the cap. A reservoir is provided. The reservoir and the vent duct are configured such that condensate precipitating in the vent duct accumulates in the reservoir when the cap is in the state fitted to the sample vessel.

19 Claims, 6 Drawing Sheets

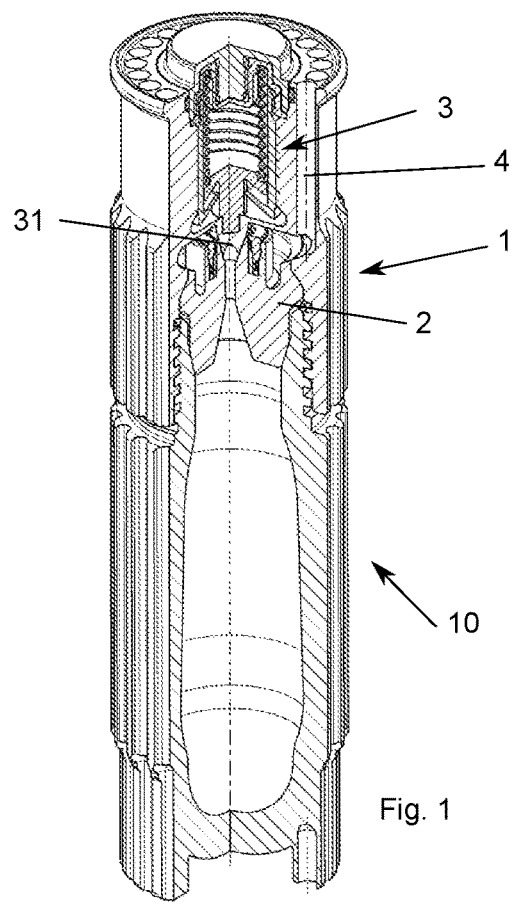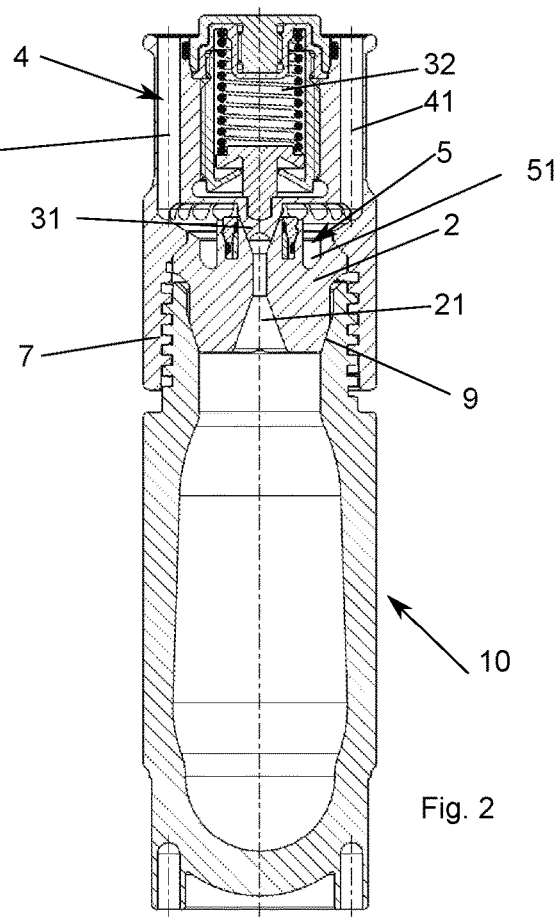
Fig. 1
Fig. 2

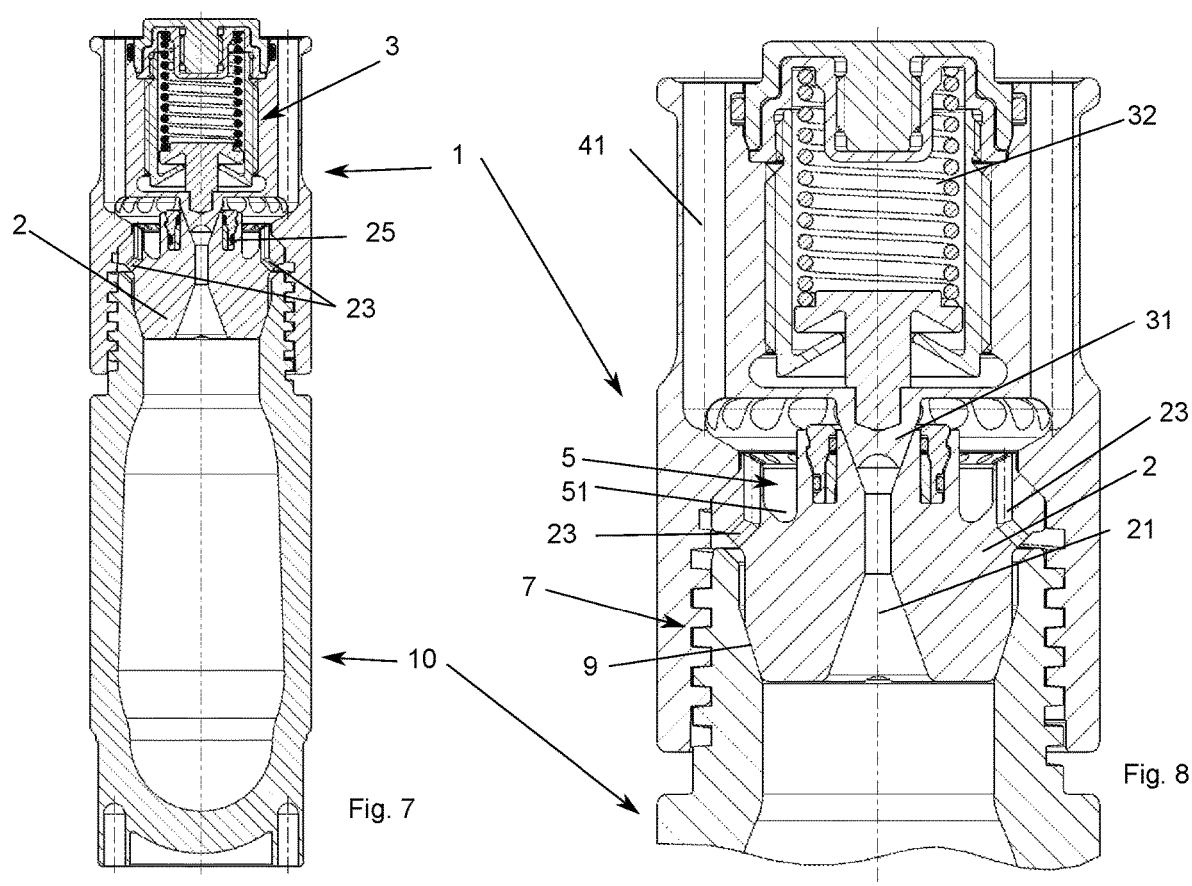

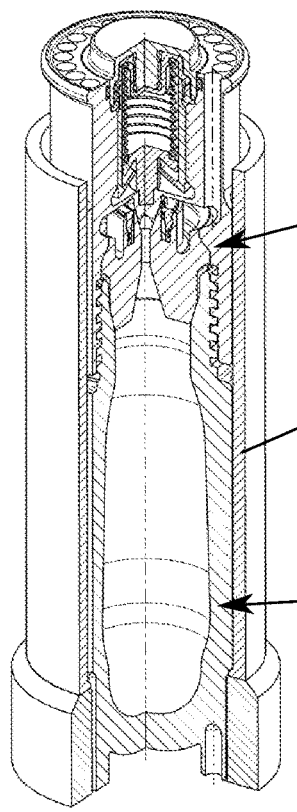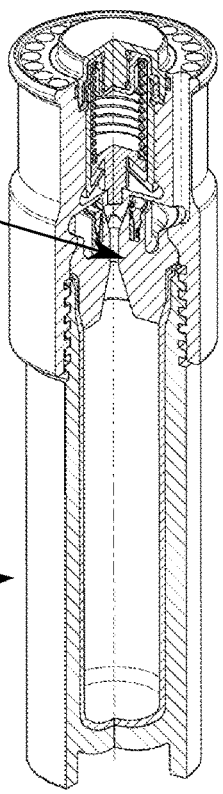
Fig. 11    Fig. 12
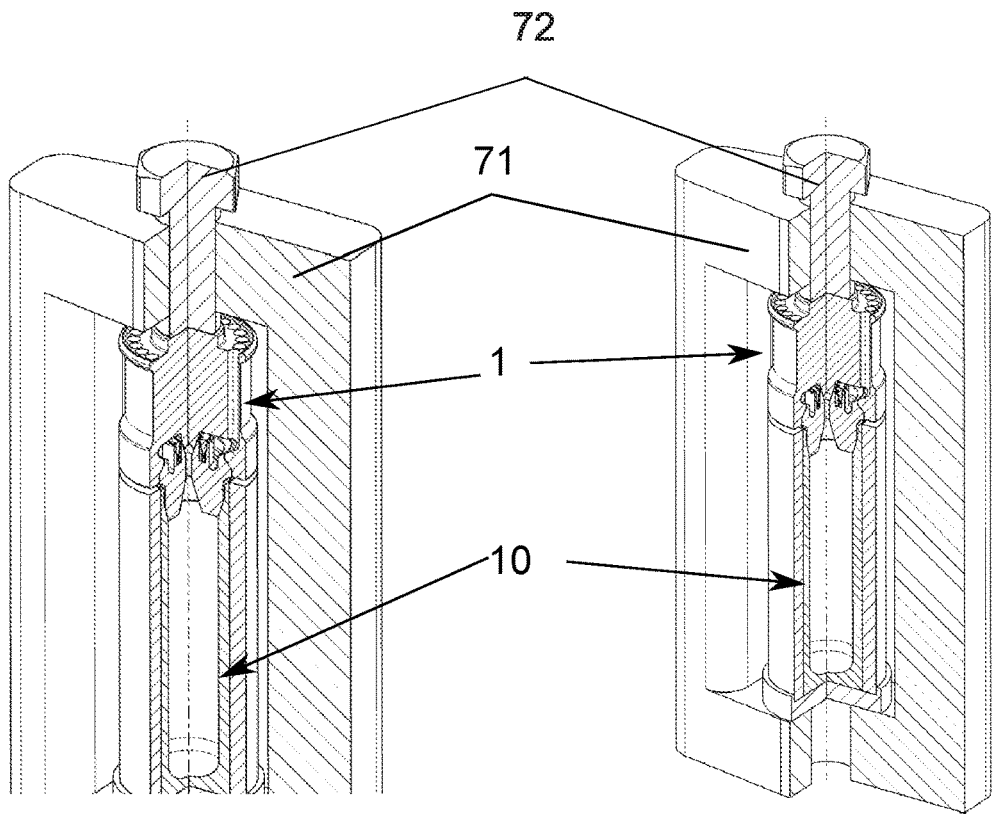
Fig. 13    Fig. 14

CAP FOR CLOSING A SAMPLE CONTAINER FOR MICROWAVE TREATMENT AND A METHOD AND SAMPLE ASSEMBLY FOR PERFORMING MICROWAVE TREATMENT

CROSS-REFERENCE TO RELATED APPLICATION

This application claims the priority, under 35 U.S.C. § 119, of Austrian patent application A50631/2018, filed Jul. 20, 2018; the prior application is herewith incorporated by reference in its entirety.

BACKGROUND OF THE INVENTION

Field of the Invention

The invention relates to a cap for closing a sample vessel for the microwave treatment and also a sample assembly and a method.

The use of microwave energy to increase the temperature during chemical syntheses, chemical analysis (decomposition reactions) and similar processes has been known from the prior art for some time. Apart from accelerating known reactions/processes, above all also during sample decomposition, this allows an increase in yields, improvement in the purity of the products, and the possibility of completely new syntheses/reactions through the high input of energy into the samples.

Many of the customary devices and methods used in microwave chemistry are based on conventional domestic microwave ovens and work at frequencies of around 915 Mhz or 2.45 GHz. This means that reasonably priced microwave sources such as magnetrons are available for ovens of this kind. A traditional microwave oven is generally made up of a microwave source for generating microwaves, an oven chamber and a means of transferring microwaves from the microwave generator into the oven chamber. The oven chamber in these microwave ovens is therefore the microwave applicator cavity in which standing waves in different longitudinal and transverse modes of the microwave field overlap. The resulting spatial energy distribution is inhomogeneous and usually has hot spots and cold spots.

Apart from these multimode cavities which provide a large sample space with different propagation modes and are similar to traditional domestic microwaves, single-mode units for chemical applications are also known in the art for small sample quantities. In this case, individual vessels, or the content thereof, are used in different assemblies with a wave propagation profile adapted to these.

In the case of chemical synthesis and/or decomposition, whether in single-mode or multi-mode models, either an insert is provided in the microwave cavity for receiving substances to be heated or holding means for multiple containers are provided which may be fitted with a greater number of containers.

Due to the high temperatures required, particularly during sample decomposition, the sample vessels must also above all be suitable for high pressures. Sample pressure containers are usually arranged in a microwave-transparent manner in likewise microwave-transparent container carriers and placed in an oven chamber completely suffused with microwaves. Where necessary, rotors are inserted in the oven chamber as container holders or the container holders are positioned on rotatable turntables due to the irregular distribution of the microwave energy. In the event that a sample pressure container should explode, the sample chamber is very adversely affected in structurally mechanical terms and is consequently of particularly robust—and therefore expensive—design.

Since the entire cavity is suffused with microwaves, greater technical complexity is involved in the use of sensors for pressure and temperature measurement. As is known in the art, sensors which are fitted within the cavity must be protected from microwave radiation. Moreover, limitations exist on the one hand when it comes to the choice of material and on the other hand in relation to the geometric configuration which places special demands on metallic components.

Published, non-prosecuted German patent application DE 4413425 A1 shows a vessel holder/rotor made of microwave-transparent material in which the likewise microwave-transparent vessels containing the sample are introduced. The entire assembly is then introduced into a microwave oven with a multi-mode chamber/oven space and used for decomposition/synthesis/conversions, etc. These multi-user sample holders are usually made of microwave-transparent material; a rotor of this kind which is placed in the oven chamber is described in German utility patent DE 9309355U1, page 4, lines 5 ff.

At the same time, however, the use of plastics and composite materials with glass fibers in the plastic, for example, brings with it a host of disadvantages. When taken to their thermal application limits, structurally stable, high-performance plastics only have comparatively low strengths and age very quickly. Twisted glass tubes with plastic matrix likewise relax during loading of the diameter and become "frayed" at the end faces. Glass and ceramic are brittle, sensitive and expensive. Moreover, all these materials exhibit a more or less high microwave absorption—i.e. microwave energy is "lost" at the pressure shell. Multi-layered sample vessels which have the necessary structural stability, even at high temperatures, and provide an adequate support function for the liner used are therefore employed in plastic vessel holders, wherein the innermost sample vessel is made of PTFE, is usually separately configured, and is introduced into a supporting shell.

For example, U.S. Pat. No. 6,926,939 shows a special supporting shell made of a microwave-transparent material for vessels of this kind.

Treatment or heating of a sample is carried out in the prior art according to the now described measures.

A sample is weighed by the user in the pressure vessel and then a microwave-absorbing, liquid reagent is added to it. The reagent is made up of acids, typically $HNO_3$, HCl, HF, $H_2SO_4$, $H_3PO_4$, and mixtures thereof, or solvents. The pressure vessel is then closed, inserted into a supporting structure, placed in an applicator and irradiated with microwaves. The materials of the pressure vessel and the supporting structure have an either transparent or reflecting effect on the microwave radiation with which selective heating of the sample and reagent takes place. Since the pressure vessel is tightly closed, when the sample is heated beyond boiling point there is a rise in pressure inside the sample vessel, wherein gases are formed by the desired chemical reactions of sample and reagent which further increase the pressure. In order to limit this rise in pressure to a level that can be tolerated by the pressure vessel and the supporting structure, technical means are used, in particular pressure relief valves, which bring about a selective venting of the pressure vessel at a defined threshold pressure and close the pressure vessel tightly again once the pressure has dropped below this limit. This venting function which automatically closes again represents the state of the art in various embodiments for the application purpose described.

The disadvantage of all previous systems is that during venting not only do the reaction gases escape from the pressure vessel, as desired, but with them substantial fractions of acid or solvent vapor too. In the case of acid vapors, this leads to corrosion problems for the pressure vessel, the supporting structure, and the components of the microwave applicator, wherein during the use of solvents this can even lead to the formation of a hazardous, explosive atmosphere.

In order to address these problems, a vent duct with a small flow cross section is usually chosen. However, this has the disadvantage that during violent reactions the quantity of gases created in the pressure vessel per unit of time exceeds the conveying capacity of the venting device, which can even lead to the bursting of the pressure vessel and the supporting structure.

SUMMARY OF THE INVENTION

The problem addressed by the invention is therefore that of minimizing the quantity of acid and solvent vapors escaping during venting in reactions with normal to high gas formation, and delaying the timing of this, without thereby impeding the desired pressure drop in the vessel. Furthermore, the problem in the case of a violent reaction with extreme gas formation is that of avoiding the bursting of the pressure vessel and the supporting structure.

This problem is solved by the characterizing features of the independent claim relating to a cap. It is provided in this case that a reservoir is provided, wherein the reservoir and the vent duct are configured in such a manner that condensate precipitating in the vent duct accumulates in the reservoir, in particular completely, when the cap is in the state fitted to the sample vessel.

The formation of a reservoir in the vent duct makes it possible for the precipitating condensate to accumulate within the cap and thereby prevent the corrosive vapors or acids from escaping from the cap. In this way, the handling of the cap and of the sample vessel are simplified and made safer in general. The acid droplets which form thereby remain in the vessel cap and do not contribute to corrosive damage and safety risks. Furthermore, it is possible that through the accumulation of acid droplets in the reservoir, these slowly evaporate and are thereby delivered into the area surrounding the cap in low concentration as vapors, so that only small, non-hazardous quantities of harmful vapors are delivered into the area surrounding the cap and the safety risk is thereby reduced.

Particularly advantageous embodiments of the cap are more closely defined by the features of the dependent claims.

A large part of the vapors found in the vent duct can easily condense, in that the vent duct has a length of between 20 and 40 mm, in particular of between 30 and 40 mm, particularly preferably of between 30 and 35 mm.

It may be advantageously provided that the vent duct has a number of partial ducts.

An advantageous reduction in the internal pressure of the sample vessel is achieved in that the closure body has a vent hole that is particularly centrally arranged, preferably completely penetrating the closure body. The vent hole connects the inside of the sample vessel to the pressure relief valve when the cap is in the state fitted to the sample vessel, and in that the pressure relief valve has a particularly spring-loaded sealing body which is configured in such a manner that the sealing body closes the vent hole when there is a defined sealing force applied by the pressure relief valve on the sealing body.

An advantageous embodiment is provided in that the reservoir in the closure body is formed by an annular catchment groove and wherein the catchment groove is, in particular, arranged concentrically to the vent hole.

A particularly advantageous embodiment of the vent duct is facilitated in that the cap has a rotationally symmetrical, in particular cylindrical, design and the vent duct and/or the partial ducts are configured as cylindrical bores and/or in that the partial ducts are configured as cylindrical bores which are formed in the end face of the cap and connect the reservoir to the area surrounding the cap. The partial ducts run straight and are arranged distributed uniformly over the end face of the cap on the same radius.

An advantageous seal created by the closure body and/or the pressure relief valve is achieved in that the closure body and/or the pressure relief valve has a lip seal or a conical seal, wherein the sample vessel is, in particular, sealed by the lip seal or the conical seal when the cap is in the state fitted to the sample vessel.

In order to prevent a large part of the vapors from escaping into the area surrounding the cap when there is excess pressure in the sample vessel, it may be provided that the vent duct has at least 8, preferably between 20 and 30, particularly preferably 22, partial ducts. The partial ducts in particular have a diameter of at least 3 mm, in particular of 4 mm, and/or the vent duct and/or the partial ducts have a total surface area of 8,000 mm$^2$ to 10,000 mm$^2$, preferably of at least 9,000 mm$^2$.

The configuration of the cap with a plurality of vent ducts or partial ducts and a large total surface area of the partial ducts or of the vent duct make it possible for a large part of the vapors to be quickly cooled and condensed so that they can be fed back into the reservoir.

An advantageous connection between the cap and the sample vessel can be provided in that the cap has a screw thread with which the cap can be screwed onto the sample vessel.

So that the vapors are completely condensed within the cap, it may be provided that the vent duct has a length which at least corresponds to the condensation path of the gaseous fluid contained in the inside of the sample vessel. The gaseous fluid is in particular a vapor containing one of the following chemical compounds or mixtures thereof: $HNO_3$, $HCl$, aqua regia, inverse aqua regia, $H_2SO_4$, $HF$, $H_3PO_4$, $HClO_4$, $H_2O_2$, solvents or other fluids used for the decomposition and/or synthesis of samples.

A preferred material of the cap is supplied in that the cap is made of a material which is microwave-compatible and/or acid-resistant and/or solvent-resistant, in particular PTFE.

In order to further improve the evaporation of the condensate found in the reservoir, it may be provided that the closure body and/or the cap are configured in such a manner that between the inside of the sample vessel and the closure body, a thermal coupling can be produced when the cap is in the state fitted to the sample vessel. This can preferably be brought about by increasing the size of the contact surfaces of the closure body with the sample vessel and/or by increasing the size of the surface of the closure body on the surface exposed to the inside of the vessel. This leads to greater condensation of vapor located in the inside of the sample vessel and increases the temperature of the closure body in relation to the cap.

So that a greater quantity of developing vapors or a greater proportion of pressure can be removed from the inside of the vessel when there is a sharp increase in pressure inside the sample vessel, it may be provided that the closure body and/or the cap has at least one secondary vent duct which is configured and arranged in such a manner that the region of the closure body behind the sealing surface is connected to the area surrounding the cap, in particular via the vent duct, so that excess pressure existing behind the sealing surface can escape via the secondary vent duct into the surrounding area.

In the inside of the sample vessel, reactions can lead to a sharp rise in pressure or an explosive concentration of vapors which have to be removed quickly or the pressure has to be reduced quickly, in order to prevent the sample vessel from bursting. By removing the closure body from the sample vessel, a larger venting cross section is facilitated and a quicker decrease in pressure in the sample vessel can thereby be achieved.

So that the forces of the pressure relief valve can be advantageously absorbed in the closure body, it may be provided that the wall of the closure body has a reinforcement for absorbing compressive forces in the region of the pressure relief valve. The reinforcement contains, in particular, a rotationally symmetrical metallic material which is arranged concentrically about the vent hole.

A further aspect of the invention is that of providing a sample assembly according to the invention, wherein the sample vessel is closed using a cap according to the invention.

A rapid drop in pressure in the sample vessel can be achieved in that the cap and/or the supporting structure of the sample vessel, in particular the region of the screw thread of the cap and/or of the supporting structure of the sample vessel, are flexibly configured in such a manner that when a second pressure level is exceeded in the sample vessel, the cap and/or the sample vessel, in particular the region of the screw thread of the cap and/or of the sample vessel, are elastically deformable in such a manner that the closure body of the cap lifts partially, in particular completely, from the sealing surface of the sample vessel and excess pressure escapes from the inside of the vessel via the opening vent duct into the surrounding area, wherein when it again drops below the pressure level in the vessel interior, the closure body closes the sample vessel once again.

It may be advantageously provided that the sample assembly contains a supporting structure. The supporting structure is configured in such a manner that the supporting structure absorbs the forces acting along the axis of the cap, in particular, and wherein the cap can be pressed onto the sample vessel by the supporting structure, in particular using an elastic screw.

A further aspect of the invention is that of providing a method for the microwave treatment of samples. The method containing the following steps of:
wherein the sample is sealed in a sample vessel using a cap according to the invention,
wherein the sample is heated using microwave radiation,
wherein when a first pressure level exists in the inside of the sample vessel, the excess pressure and vapors located within the sample vessel are vented via a pressure relief valve and a vent duct to the area surrounding the cap,
wherein the vapors escaping from the inside of the sample vessel are condensed as condensate, in particular completely, in the vent duct,
wherein the condensate is collected in a reservoir, and
wherein the condensate is evaporated, in particular by raising the temperature in the reservoir.

Other features which are considered as characteristic for the invention are set forth in the appended claims.

Although the invention is illustrated and described herein as embodied in a cap for closing a sample container for microwave treatment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1 and 2 show a partial and full sectional view of a first embodiment of the sample assembly according to the invention;

FIG. 7 is a sectional view of a second embodiment of the cap according to the invention;

FIG. 8 is a sectional view of a detail view of the cap in the second embodiment;

FIGS. 11 to 14 are diagrammatic, perspective and sectional views of different embodiments of the sample assembly according to the invention.

DETAILED DESCRIPTION OF THE INVENTION

Figures 3, 4:
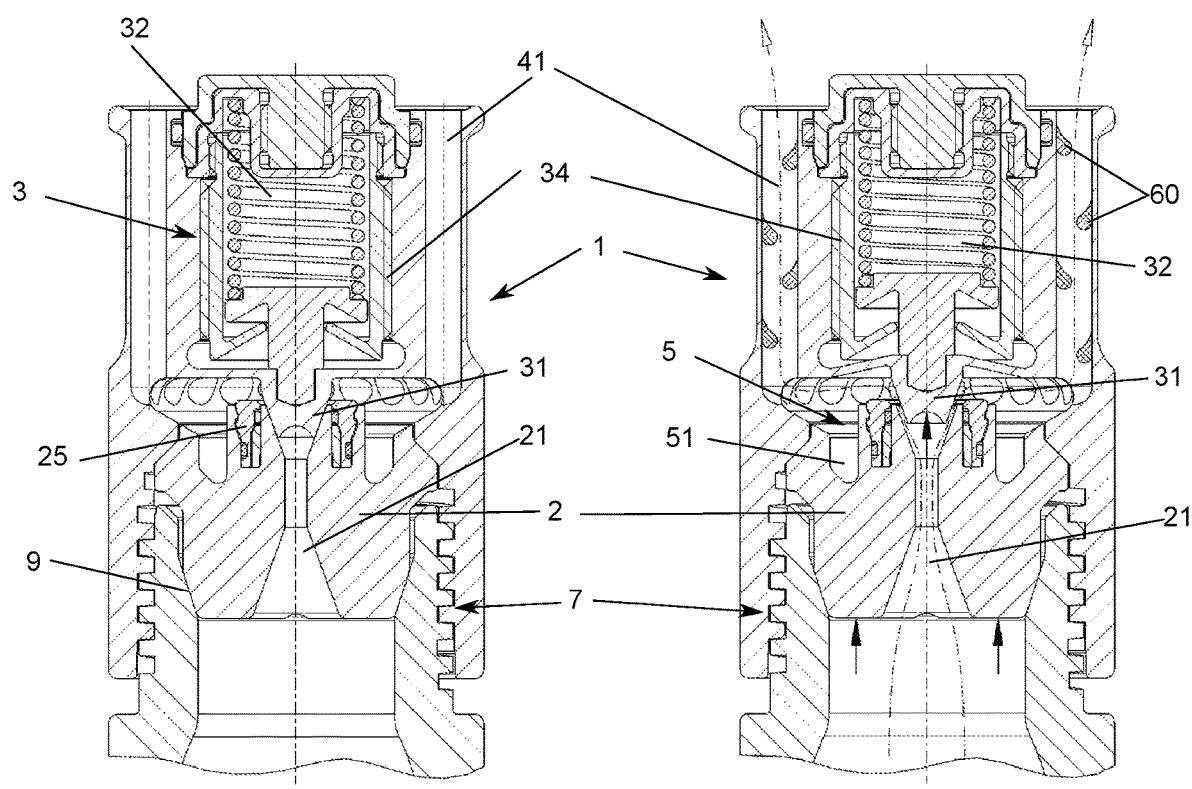
FIGS. 3 to 6 are diagrammatic, sectional show a cap according to the invention in various functional states.

Referring now to the figures of the drawings in detail and first, particularly to FIGS. 1 and 2 thereof, there is shown a first embodiment of a sample assembly according to the invention with a sample vessel 10 and a cap 1 fitted to the sample vessel 10. The cap 1 encloses a closure body 2 which closes the open end of the sample vessel 10 and rests thereon in a sealing manner with a sealing surface 9. The cap 1 further encloses a pressure relief valve 3, whereof a sealing body 31 is pressed by a compressive spring 32 into a vent hole 21 of the closure body 2 and closes this tightly. The vent hole 21 is arranged centrally in the closure body 2 and connects the inside of the sample vessel 10 to the pressure relief valve 3. A vent duct 4 is formed in the cap 1, which vent duct is made up of a number of partial ducts 41, wherein via the vent duct 4 the inside of the sample vessel 10 is connected to the area surrounding the cap 1 via the vent hole 21, the pressure relief valve 3 and the vent duct 4.

The cap 1 in the first embodiment is configured rotationally symmetrically and cylindrically, wherein the partial ducts 41 of the vent duct 4 are configured as cylindrical bores which are introduced in the end face of the cap 1. The partial ducts 41 in this case are arranged uniformly arranged distributed over the end face of the cap 1 on the same radius and run parallel to the cylinder axis of the cap 1.

The cap 1 further has a reservoir 5 which is configured in the closure body 2 in this embodiment as a catchment groove 51 configured concentrically to the axis of the cap 1. The catchment groove 51 is further arranged concentrically to the vent hole 21 and extends from the region in which the vent hole 21 encounters the pressure relief valve 3 or the sealing body 31 of the pressure relief valve 3 in the direction of the opening of the vent hole 21 lying opposite the pressure relief valve 3. The closure body 2 in this embodiment has a conical seal with which the closure body 2 rests against the opening in the sample vessel 10 configured diametrically opposite the closure body 2 with the sealing surface 9. The sealing body 31 of the pressure relief valve 3 is likewise conical in design and is pressed by the compression spring 32 into the diametrically opposed conical part of the vent hole 21 in the closure body 2.

The cap 1 and the sample vessel 10 each have a screw thread 7 configured in a diametrically opposed manner with which the cap 1 is screwed onto the sample vessel 10 and the sealing of the sample vessel is affected by means of the closure body 2 on the sealing surface 9.

A detail view of the cap 1 according to the invention is depicted as a sectional view in FIG. 3. The inside of the sample vessel 10 is connected via the vent hole 21 introduced in the closure body 2 and via the partial ducts 41 of the vent duct 4 to the area surrounding the cap 1. The reservoir 5 is arranged in the transitional region between the vent hole 21 and the vent duct 4, wherein the partial ducts 41 running parallel to the axis of the cap 1 open out into the reservoir 5 in the gravitational direction. The sealing body 31 of the pressure relief valve 3 is pressed via the compressive spring 32 into the vent hole 21 and closes the hole, so that no vapors can escape from the inside of the sample vessel 10. At the end of the vent hole 21 close to the sealing body 31 a reinforcement 25 is formed in the closure body 2 which reinforces the material of the closure body 2 and absorbs the compressive forces of the sealing body 31, in order to prevent deformation of the material of the closure body 2.

The reinforcement 25 is preferably made of metallic material configured in a rotationally symmetrical manner about the sealing body 31 in such a manner that no point discharges can take place in the microwave field. To achieve high compressive strength from the combination of reservoir 5 and vent hole 21 in the closure body 2, aluminum, steel, nickel/base alloys are preferably used. In addition, ceramic support rings or reinforcements 25 are also conceivable which do not lead to discharges in the microwave field. The person skilled in the art knows that metallic parts in the microwave have to be configured in such a manner that no discharges take place and if metallic springs are fitted in the pressure relief valve these have to have a metal screen, for example. For the small reinforcement 25 in the closure body 2, it is sufficient for the reinforcement to have a rotationally symmetrical design without edges.

Figures 5, 6:
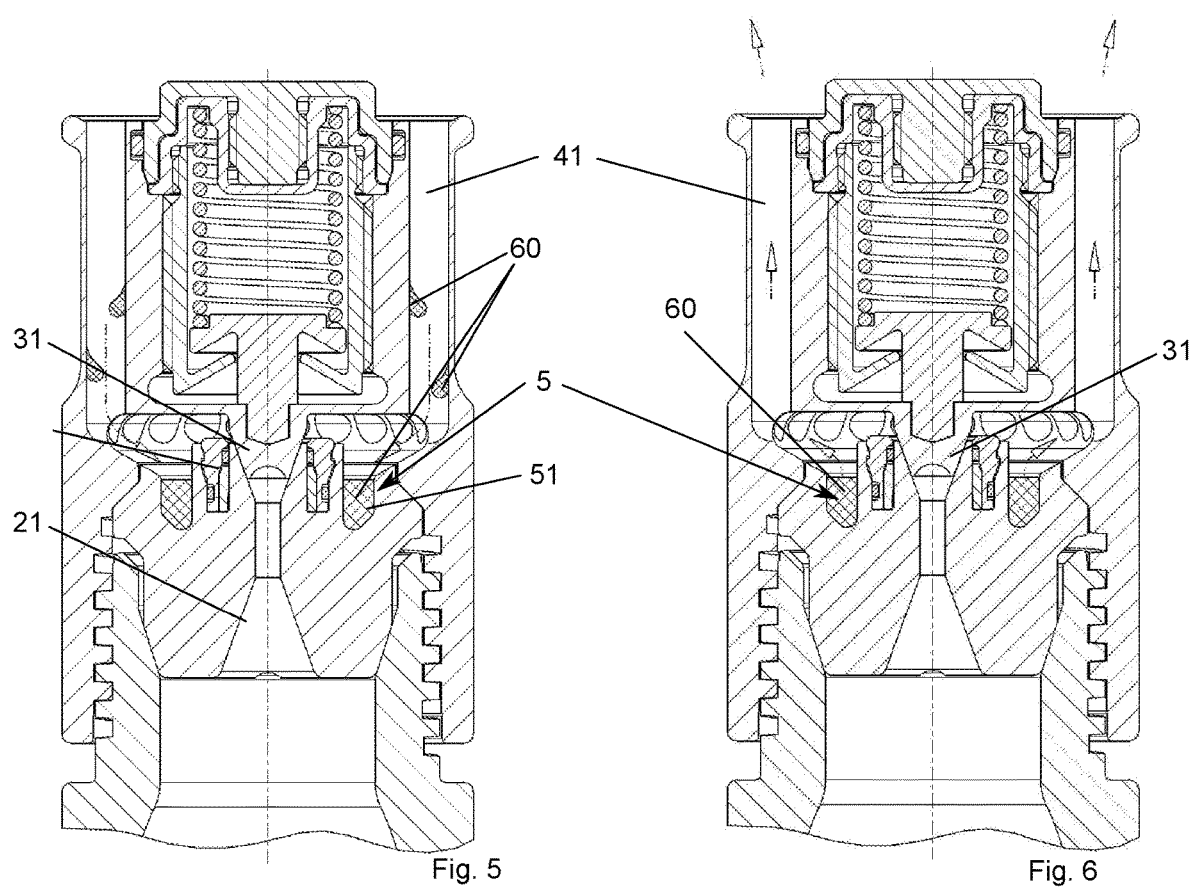
Figure 9:
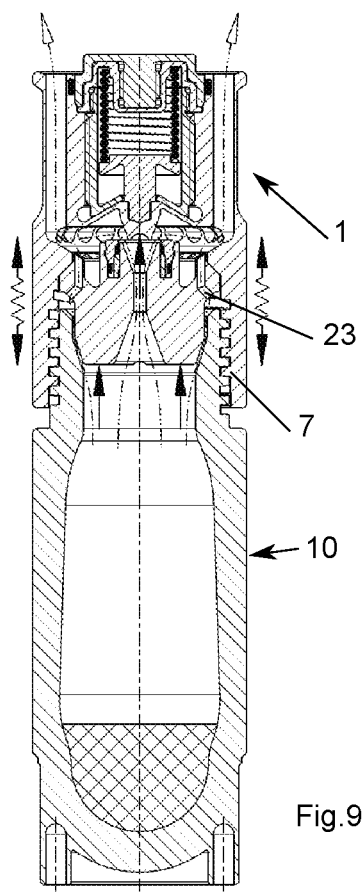
FIGS. 9 and 10 are sectional views showing the second embodiment of the invention in a functional state with the closure body raised.

The method according to the invention or the mode of operation of the cap 1 according to the invention is described by way of example with the help of the first embodiment with reference to FIGS. 4 to 6.

The user adds a sample to the sample vessel 10 in admixture with a liquid reagent and then closes the sample vessel 10 with the cap 1. By screwing the screw thread 7 of the cap 1 to the screw thread of the sample vessel 10, the conical sealing surface of the closure body 2 is placed against the opening of the sample vessel 10 and thereby tightly sealed. The sample vessel 10 is then placed in an applicator and irradiated with microwaves. The material of the sample vessel and of the cap 1 is transparent to the microwave radiation in this case, which means that selective heating of the sample and the reagent is achieved. Since the sample vessel 10 is tightly closed with the closure body 2, when the sample is heated above boiling point, there is a rise in pressure in the inside of the sample vessel. When there is too great a pressure rise in the inside of the sample vessel, the pressure at the closure body 2 rises above a first defined pressure level, wherein the sealing body 31 is displaced in the direction of the spring 32 by the pressure applied thereto via the vent hole 21 and the sealing body 31 is lifted slightly from the vent hole 21. By lifting the sealing body 31 from the vent hole 21, the excess pressure applied in the inside of the sample vessel 10 is discharged via the partial ducts 41 of the vent duct 4 into the area surrounding the cap 1. Since the partial ducts 41 of the vent duct 4 have a cooler surface than the escaping vapor, small vapor droplets 60 condense on the surface thereof. The course of the partial ducts 41 or the vent duct 4 in the gravitational direction means that the condensed vapor droplets 60 are diverted by gravity in the direction of the reservoir 5 and accumulate therein (FIG. 5). If the pressure in the inside of the sample vessel 10 once again falls below the first pressure level, the spring 32 of the pressure relief valve 3 presses the sealing body 31 back into the vent hole 21 and closes it tightly. The droplets 60 located in the vent duct 4 are heavy enough through accumulation and run downwards in the gravitational direction into the bores or partial ducts 41 and accumulate in the reservoir 5 or else the catchment groove 51 provided therefor. Since the closure body 2 is heated on account of its thermally insulated position inside the cap 1 by the inside of the sample vessel 10, this leads to the slow evaporation of condensate from the reservoir 5. This slow evaporation process under atmospheric conditions has the now described advantages for the different reagents used.

For acid applications: The temperature of the acid vapors escaping through evaporation is up to 150° C. lower than in the case of the primary venting process. The corrosive action of these vapors on the components of the sample vessel of the supporting structure and the microwave applicator is therefore several factors smaller than during the outflow of vapor with excess pressure from the sample vessel 10.

For solvent applications: The slow evaporation of solvents from the reservoir 5 allows sufficient evaporation of these vapors under atmospheric conditions, since ventilation is constantly provided in the microwave applicator when using solvents. Any creation of hazardous explosive atmospheres in the inside or the applicator is thereby avoided.

In FIGS. 7 to 10 a second embodiment of the cap 1 according to the invention or of the sample assembly is depicted. The cap 1 in this case is identical in design to the first embodiment, wherein the closure body 2 is configured accordingly as a conical seal and the sample vessel 10 or sealing surface 9 and the closure body 2 has, in addition, a number of secondary vent ducts 23. The secondary vent ducts 23 are configured in the closure body 2 with a portion running parallel to the axis of the cap 1 and a portion inclined obliquely outwards. The secondary vent ducts 23 connect the region of the closure body 2 behind the sealing surface 9, against which the closure body 2 rests in the sample vessel 10 in a sealing manner, to the vent duct 4 and therefore to the area surrounding the cap 1. An excess pressure applied behind the sealing surface 9 may escape in such a manner via the secondary vent ducts 23 into the area surrounding the cap 1 via the vent duct 4 or the partial ducts 41. The cap 1 is flexibly configured in the region of the screw thread 7 in the second embodiment, so that when a second pressure level is applied to the closure body 2, the material of the cap 1 is elongated and elastically deformed (FIG. 8, FIG. 10), so that the closure body 2 can lift slightly from the sample vessel 10 and a gap forms between the closure body 2 and the neck of the sample vessel 10. The cap 1 is stretched in an elastic manner in the region of the spring symbol in FIGS. 9 and 10 when there is excessive pressure. The vent ducts 23 then enlarge the original vent cross section of the vent hole 21 by a factor of 2-10, preferably by a factor of 6-8.

Figure 10:
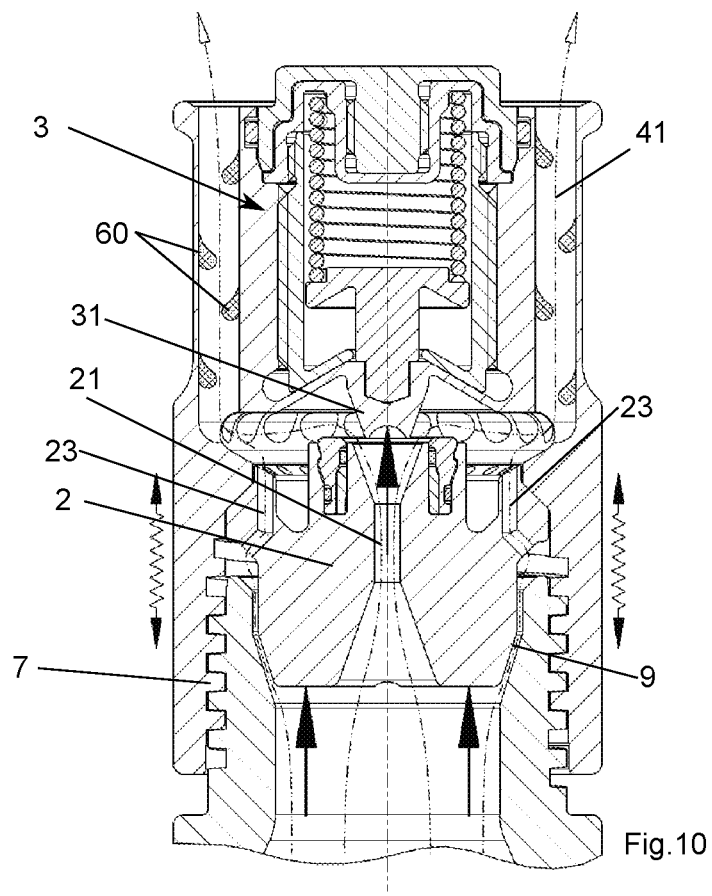

In case of a violent reaction inside the sample vessel 10 with a strong gas formation, it may be that the conveying capacity of the vent duct 4 reaches its limits, as a result of which there is a further pressure rise inside the sample vessel 10, even when the pressure relief valve 3 is completely open. Consequently, if the pressure level inside the sample vessel 10 exceeds a second pressure level in the sample vessel 10 which lies above the first pressure level, the closure body 2 is lifted slightly from the sample vessel 10 by the elastic design of the cap 1 in the region of the screw thread 7 and the excess pressure inside the sample vessel 10 is able to escape via the gap between the closure body 2 and the sample vessel 10, the secondary vent ducts 23 and the vent duct 4 or the partial ducts 41 into the surrounding area. Since the partial ducts 41 or the vent duct 4 have a very large and cooler surface, part of the vapor or the vapor as a whole can condense and thereby wets the surface of the partial ducts 41 in the form of small droplets 60. The droplets 60 in turn form larger droplets which are sufficiently heavy and drain off along the vent duct 4 in the direction of the reservoir 5 and they are held there (FIG. 10).

In embodiments of the cap 1 according to the invention, the vent duct 4 or the partial ducts 41 have a length of between 20 mm and 40 mm, in particular of between 30 and 40 mm, particularly preferably of between 30 mm and 35 mm. The number of partial ducts 41 in this case is around at least 8, preferably between 20 and 30, and particularly preferably around 22 partial ducts 41. The partial ducts 41 in this case each have a diameter of at least 3 mm, in particular of 4 mm. Through the previously referred to dimensions, it is possible for an advantageous overall surface of the vent duct 4 or of the partial ducts 41 to be achieved which have a total surface area of at least 8,000 mm$^2$ to 10,000 mm$^2$, preferably of at least 9,000 mm$^2$. The preferred total surface area and dimensions of the partial ducts 41 and of the vent duct 4 mean that a particularly large amount of the vapor escaping in the vent duct 4 from the sample vessel 10 condenses, as a result of which safety when using the cap 1 according to the invention or else the sample assembly according to the invention is further improved.

Furthermore, it may be provided that the closure body 2, or else the entire cap 1, is thermally coupled with the sample vessel 10 or the inside of the sample vessel 10, so that the temperature prevailing inside the sample vessel 10 is transferred to the cap 1 or else the closure body 2. The increase in temperature of the cap 1 and/or of the closure body 2 means that evaporation of the condensate accumulating in the reservoir 5 is improved, so that under controlled conditions this can be discharged from the cap 1.

The material of the cap 1 or else of the sample vessel 10 comprises a microwave-compatible material, in particular PTFE, so that the microwave radiation is advantageously conducted into the inside of the sample vessel 10.

Alternatively, it may be provided that a lip seal is formed at the site of the conical seal between the closure body 2 and the sample vessel 10 or between the pressure relief valve 3 and the closure body 2, with which lip seal the sample vessel 10 or the vent hole 21 is sealed.

Alternatively, it may be provided that the vent duct 4 or the partial ducts 41 exhibit a defined length which at least corresponds to the condensation path of the gaseous fluid contained inside the sample vessel. The condensation path in this case is the length required by the vapor present in the binary vapor mixture in order to condense completely. Hence, it can be brought about that the fluid contained in the vapor completely condenses within the vent duct 4 or the partial ducts 41 and any acids or solvents can therefore be completely held within the cap 1. The vapor or the gaseous fluid that escapes from the sample vessel 10 in this case preferably contains one of the following chemical compounds or mixtures thereof: $HNO_3$, $HCl$, aqua regia, inverse aqua regia, $H_2SO_4$, $HF$, $H_3PO_4$, $HClO_4$, $H_2O_2$, solvents or other fluids used for the decomposition of samples.

Advantageous embodiments of the sample assembly according to the invention are depicted in FIGS. 11 to 14. It is possible in this case for the sample assembly to have a supporting structure 70 into which the sample vessel 10 with the cap 1 fitted is introduced. The supporting structure 70 in this case absorbs the radial forces in the vessel wall and reduces the risk that the sample vessel 10 will break or burst.

Alternatively, as depicted in FIG. 12, it may be provided that the sample vessel 10 itself has a reinforced structure or wall which is adapted to the pressure conditions present inside the sample vessel 10.

Alternatively, it may further be provided that, as shown in FIGS. 13 to 14, the sample assembly is embedded or clamped in an external supporting structure 71 or a rotor which absorbs the forces occurring inside the sample vessel 10. The supporting structure 71 has a portal-like design. The sample assembly with sample vessel 10 and the cap 1 fitted thereto is inserted in the inside of the supporting structure 71. A clamping element, in this embodiment a screw 72, of the supporting structure presses on the end face of the cap 1 and thereby holds the cap 1 on the sample vessel 10.

Alternatively, the supporting structure 71 replaces the screw thread 7 of the cap 1. Accordingly, the supporting structure 71 or the screw 72 of the supporting structure are elastically configured and are deflected in a spring-like manner when there is an undue amount of excess pressure.

The invention claimed is:

1. A cap for closing a sample vessel for a microwave treatment, the cap comprising:
    a closure body for closing the sample vessel and having a sealing surface, said closure body being fitted to the sample vessel and closes the sample vessel by said sealing surface when the cap is in a state fitted to the sample vessel;
    a spring-loaded pressure relief valve;
    at least one vent duct, said vent duct, said spring-loaded pressure relief valve and said closure body are configured in such a manner that said vent duct connects said closure body via said spring-loaded pressure relief valve to a surrounding area in such a manner that when a defined first pressure level is exceeded at said closure body excess pressure can escape through said vent duct into the area surrounding the cap; and
    a reservoir, wherein said reservoir and said vent duct are configured in such a manner that condensate precipitating in said vent duct accumulates in said reservoir when the cap is in the state fitted to the sample vessel.

2. The cap according to claim 1, wherein said vent duct has a length of between 20 and 40 mm.

3. The cap according to claim 1, wherein said vent duct has a plurality of partial ducts.

4. The cap according to claim 1, wherein:
    said closure body has a vent hole formed therein, said vent hole connecting an inside of the sample vessel to said spring-loaded pressure relief valve when the cap is in the state fitted to the sample vessel; and said spring-loaded pressure relief valve has a spring-loaded sealing body which is configured in such a manner that said spring-loaded sealing body closes said vent hole when there is a defined sealing force applied by said spring-loaded pressure relief valve on said spring-loaded sealing body.

5. The cap according to claim 1, wherein said reservoir in said closure body is formed by an annular catchment groove and said annular catchment groove is disposed concentrically to said vent hole.

6. The cap according to claim 3, wherein the cap has a rotationally symmetrical design and said vent duct and/or said partial ducts are configured as cylindrical bores.

7. The cap according to claim 6, wherein said partial ducts configured as said cylindrical bores are formed in an end face of the cap and connect said reservoir to the area surrounding of the cap, wherein said partial ducts run straight and are disposed distributed uniformly over said end face of the cap on a same radius.

8. The cap according to claim 1, wherein:
said closure body has a lip seal or a conical seal; and
the sample vessel is sealed by said lip seal or said conical seal when the cap is in the state fitted to the sample vessel.

9. The cap according to claim 3, wherein said vent duct has at least 8 said partial ducts and said partial ducts have a diameter of at least 3 mm.

10. The cap according to claim 3, wherein said vent duct and/or said partial ducts have a total surface area of 8,000 mm$^2$.

11. The cap according to claim 1, further comprising a screw thread with which the cap can be screwed onto the sample vessel.

12. The cap according to claim 1, wherein said vent duct has a length which at least corresponds to a condensation path of a gaseous fluid contained in an inside of the sample vessel, wherein the gaseous fluid is a vapor containing one of the following chemical compounds or mixtures thereof: $HNO_3$, HCl, aqua regia, inverse aqua regia, $H_2SO_4$, HF, $H_3PO_4$, $HClO_4$, $H_2O_2$, solvents or other fluids used for decomposition and/or synthesis of samples.

13. The cap according to claim 1, wherein the cap is made of a material which is microwave-compatible and/or acid-resistant and/or solvent-resistant.

14. The cap according to claim 1, wherein at least one of said closure body or the cap is configured in such a manner that between an inside of the sample vessel and said closure body, a thermal coupling can be produced when the cap is in the state fitted to the sample vessel.

15. The cap according to claim 1, wherein at least one of said closure body or the cap has at least one secondary vent duct which is configured and disposed in such a manner that a region of said closure body behind said sealing surface is connected to the area surrounding the cap so that excess pressure existing behind said sealing surface can escape via said secondary vent duct into the surrounding area.

16. The cap according to claim 4, wherein said closure body has a wall with a reinforcement for absorbing compressive forces in a region of said pressure relief valve, wherein said reinforcement has a rotationally symmetrical metallic material which is disposed concentrically about said vent hole.

17. A sample assembly, comprising:
a sample vessel;
a cap closing said sample vessel, said cap containing:
a closure body for closing said sample vessel and having a sealing surface, said closure body being fitted to said sample vessel and closes said sample vessel by said sealing surface when said cap is in a state fitted to said sample vessel;
a spring-loaded pressure relief valve;
at least one vent duct, said vent duct, said spring-loaded pressure relief valve and said closure body are configured in such a manner that said vent duct connects said closure body via said spring-loaded pressure relief valve to a surrounding area in such a manner that when a defined first pressure level is exceeded at said closure body excess pressure can escape through said vent duct into the area surrounding said cap; and
a reservoir, wherein said reservoir and said vent duct are configured in such a manner that condensate precipitating in said vent duct accumulates in said reservoir when said cap is in the state fitted to said sample vessel.

18. The sample assembly according to claim 17, wherein at least one of said cap or said sample vessel are flexibly configured in such a manner that when a second pressure level is exceeded in said sample vessel, at least one of said cap or said sample vessel are elastically deformable in such a manner that said closure body of said cap lifts partially from said sample vessel and excess pressure escapes from an inside of a vessel interior via said vent duct into the surrounding area, wherein when it again drops below the pressure level in said vessel interior, said closure body closes said sample vessel once again.

19. The sample assembly according to claim 17, wherein said sample assembly has a supporting structure, said supporting structure is configured in such a manner that said supporting structure absorbs forces acting along an axis of said cap, and wherein said cap can be pressed onto said sample vessel by said supporting structure.

* * * * *